(12) United States Patent
Mohtasham et al.

(10) Patent No.: US 12,395,747 B2
(45) Date of Patent: Aug. 19, 2025

(54) LOOKUP TABLE PROCESSING AND PROGRAMMING FOR CAMERA IMAGE SIGNAL PROCESSING

(71) Applicant: Google LLC, Mountain View, CA (US)

(72) Inventors: Hossein Mohtasham, San Diego, CA (US); Yuriy Romanenko, San Jose, CA (US); Munenori Oizumi, San Jose, CA (US)

(73) Assignee: Google LLC, Mountain View, CA (US)

( * ) Notice: Subject to any disclaimer, the term of this patent is extended or adjusted under 35 U.S.C. 154(b) by 269 days.

(21) Appl. No.: 18/022,718

(22) PCT Filed: Aug. 24, 2020

(86) PCT No.: PCT/US2020/070451
§ 371 (c)(1),
(2) Date: Feb. 22, 2023

(87) PCT Pub. No.: WO2022/046147
PCT Pub. Date: Mar. 3, 2022

(65) Prior Publication Data
US 2023/0336879 A1    Oct. 19, 2023

(51) Int. Cl.
*H04N 23/85*  (2023.01)
*H04N 23/80*  (2023.01)
*H04N 23/84*  (2023.01)

(52) U.S. Cl.
CPC .......... *H04N 23/85* (2023.01); *H04N 23/80* (2023.01); *H04N 23/843* (2023.01)

(58) Field of Classification Search
CPC .... H04N 23/85; H04N 23/843; H04N 23/617; H04N 23/65; H04N 23/80; H04N 5/2621;
(Continued)

(56) References Cited

U.S. PATENT DOCUMENTS 9,602,739 B1      3/2017   Hodges et al.
11,132,296 B1 *   9/2021   Wu .................. G06F 7/544
(Continued)

FOREIGN PATENT DOCUMENTS

EP    2582125    4/2013
EP    2672691    12/2013

OTHER PUBLICATIONS

International Preliminary Report on Patentability in International Appln. No. PCT/US2020/070451, mailed on Mar. 9, 2023, 8 pages.
(Continued)

*Primary Examiner* — Sinh Tran
*Assistant Examiner* — Zhenzhen Wu
(74) *Attorney, Agent, or Firm* — Fish & Richardson P.C.

(57) ABSTRACT

In a general aspect, a camera can include a dynamic memory, and a software driver configured to store, in the dynamic memory, a plurality of predetermined lookup tables (LUTs), and to issue an interpolation command indicating a value of a quantitative image factor corresponding with an image frame received by the ISP. The camera can also include a LUT processing circuit configured to receive the interpolation command, and in response to receiving the interpolation command: read a first predetermined LUT and a second predetermined LUT from the dynamic memory; and perform at least one interpolation operation to generate an interpolated LUT. The camera can further include an image signal processor (ISP) including a configuration register, and the LUT processing circuit can be configured to write the interpolated LUT to the configuration register.

14 Claims, 8 Drawing Sheets

(58) Field of Classification Search
CPC ... G09G 2320/0673; G09G 2320/0693; G09G 2340/14; G09G 5/04; G09G 5/06
See application file for complete search history.

(56) References Cited

U.S. PATENT DOCUMENTS

| | | | |
|---|---|---|---|
| 2007/0252837 | A1 | 11/2007 | Demandolx |
| 2009/0010538 | A1* | 1/2009 | Kim ................. H04N 5/202 |
| | | | 382/167 |
| 2009/0154278 | A1* | 6/2009 | Chan-Choi ....... G11C 11/40615 |
| | | | 365/230.06 |
| 2013/0321676 | A1* | 12/2013 | Silverstein ........... H04N 23/631 |
| | | | 348/242 |
| 2014/0204232 | A1 | 7/2014 | Wang et al. |
| 2017/0124983 | A1 | 5/2017 | Atkins et al. |
| 2021/0360153 | A1* | 11/2021 | Desai .................... H04N 23/80 |

OTHER PUBLICATIONS

International Search Report and Written Opinion in International Appln. No. PCT/US2020/070451, mailed on Mar. 3, 2022, 11 pages.
Office Action in Indian Appln. No. 202347016634, mailed on Dec. 5, 2024, 7 pages (with English translation).

* cited by examiner

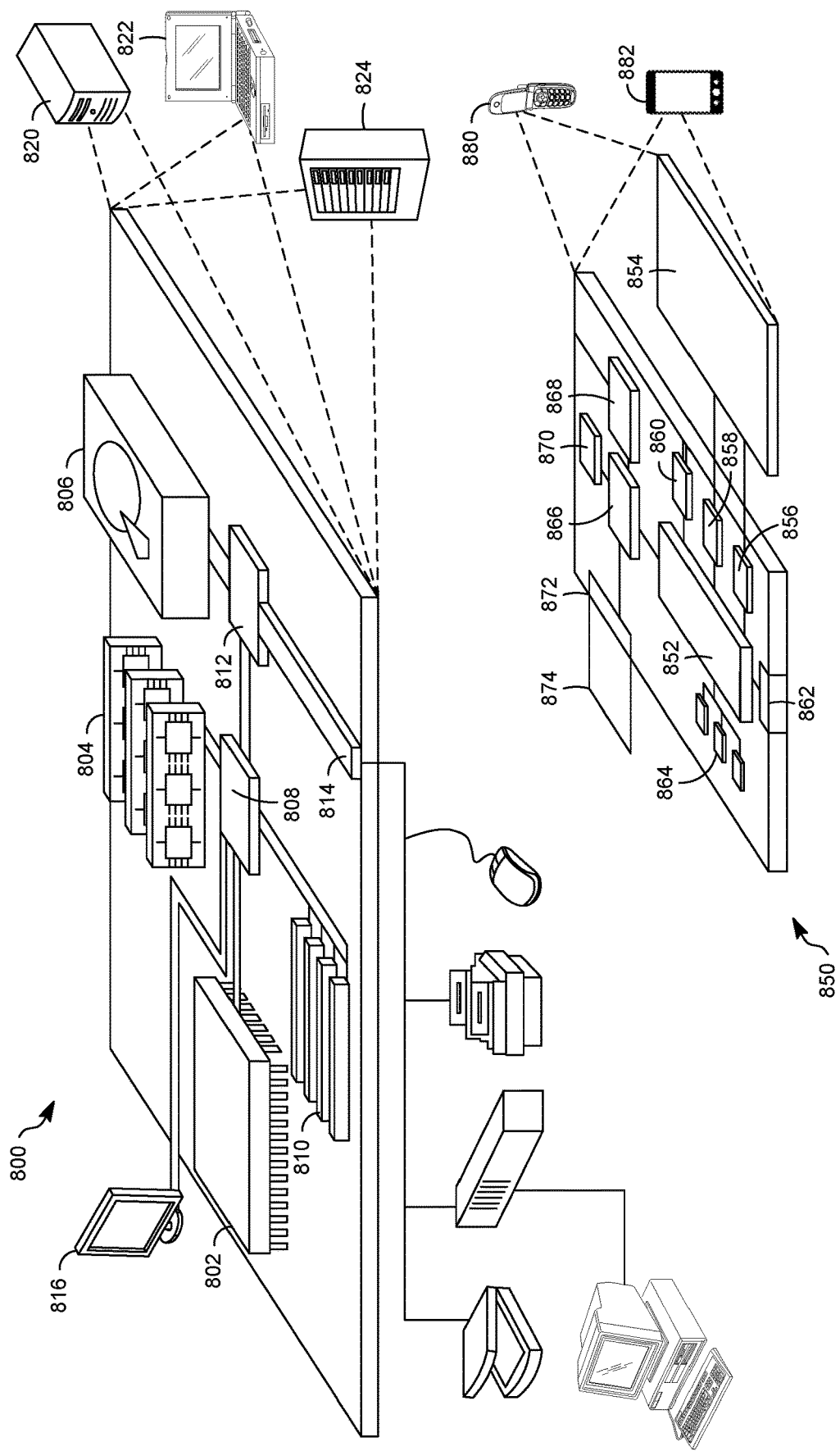

LOOKUP TABLE PROCESSING AND PROGRAMMING FOR CAMERA IMAGE SIGNAL PROCESSING

CROSS-REFERENCE TO RELATED APPLICATION

This application is a National Stage Application under 35 U.S.C. § 371 and claims the benefit of International Application No. PCT/US2020/070451, filed on Aug. 24, 2020. The contents of this application is incorporated herein by reference in its entirety.

TECHNICAL FIELD

This document relates, generally, to processing of images captured by a camera. More specifically, this document relates to approaches for interpolating and processing lookup tables, and programming configuration information for image processing in an image signal processor (ISP) of a camera, such as a camera included in a mobile electronic device.

BACKGROUND

Camera technology continues to advance. Cameras (e.g., digital cameras) are integrated in mobile electronic devices (smartphones, tablet computers, etc.) and can be implemented in recreation devices, such as action cameras, as well as many other applications, such as automotive systems, security systems, and so forth. In such digital cameras, an image signal processor (ISP) can be implemented, which can operate using one or more look up tables (LUTs) to process (e.g., adjust, tune, etc.) images (image frames, etc.) captured by an image sensor of the camera, such as by a CMOS sensor or a charge-coupled sensor, for example. Such LUTs can be stored in configuration registers (configuration memory) of the ISP and can each include a finite number of configuration values used by an ISP for processing captured image frames. Such configuration information can be related to, or correspond with, different aspects of captured image frames. These attributes can include lighting, exposure time, cumulative color temperature, chrominance, luminance, contrast, gamma, etc. of captured image frames.

Such LUTs are typically large data structures, and the attributes they correspond with can be expressed as quantitative values, which may be referred to as image factors. However, because such image factors are continuous values, generating respective predetermined LUTs for possible values of each of a plurality of image factors is not practical due, at least, to an amount of memory that would be required to store those predetermined LUTs. Therefore, interpolation (e.g., bilinear interpolation, trilinear interpolation, etc.) and other processing can be performed using predetermined lookup tables that are tuned for achieving high quality captured image frames at key (index, etc.) values of various image factors to produce interpolated lookup tables (including interpolated LUT values).

In current approaches, software drivers running on a general purpose processor are used to perform such lookup table processing, which can include interpolation operations to calculate interpolated values included in an interpolated LUT, and operations for formatting LUTs for use in specific ISP hardware. Also, because more than one image factor often is involved in interpolating each LUT used by an ISP, generating LUTs that are used by an ISP can include performing more than one interpolation operation per LUT.

Further, LUT interpolation and processing is done on a per-frame basis. Therefore, for cameras that capture image frames (e.g., video) at 60 frames per second (FPS), an associated SW driver must perform interpolation and other processing of the LUTs used by an associated ISP run 60 times per second. Using current approaches limits (or negatively impacts) image processing performance of a camera, and can also adversely impact power consumption of a corresponding general purpose processor (main processor, central processor, etc.) of an electronic devices including a digital camera.

SUMMARY

In a general aspect, a camera can include a dynamic memory, and a software driver configured to store, in the dynamic memory, a plurality of predetermined lookup tables (LUTs), a first LUT of the predetermined LUTs including first image signal processor (ISP) configuration information corresponding with a first value of a quantitative image factor, and a second LUT of the predetermined LUTs including second ISP configuration information corresponding with a second value of the quantitative image factor. The second value can be greater than the first value. The software driver can be further configured to issue an interpolation command indicating (including, specifying, etc.) a third value of the quantitative image factor corresponding with an image frame received by the ISP. The third value can be greater than the first value and less than the second value. The camera can also include a LUT processing circuit configured to receive the interpolation command, and in response to receiving the interpolation command: read the first LUT and the second LUT; and perform at least one interpolation operation to generate an interpolated LUT, the interpolated LUT can be generated based, at least, on the third value, the first LUT and the second LUT. The camera can further include an image signal processor (ISP) including a configuration register. The LUT processing circuit can be further configured to write the interpolated LUT to the configuration register.

The proposed solution thus, in particular, relates to a camera which can include an image sensor configured to capture image frames; a dynamic memory; an image signal processor, ISP, including a configuration register and a software driver. The software driver may be configured to store, in the dynamic memory, a plurality of predetermined lookup tables, LUTs, for processing image frames depending on aspects of a captured image frame and/or on a use case. A first LUT of the predetermined LUTs may include first ISP configuration information corresponding with a first value of a quantitative image factor, and a second LUT of the predetermined LUTs may include second ISP configuration information corresponding with a second value of the quantitative image factor, the second value being greater than the first value. The software drive may be further configured to issue an interpolation command including a third value of the quantitative image factor corresponding with an image frame received by the ISP, the third value being greater than the first value and less than the second value. A LUT processing circuit of the camera may be configured to receive the interpolation command, and in response to receiving the interpolation command may read the first LUT and the second LUT; and perform at least one interpolation operation to generate an interpolated LUT, the interpolated LUT being generated based, at least, on the third value, the first LUT and the second LUT. The LUT processing circuit may then be further configured to write the interpolated LUT to the configuration register of the ISP. The predetermined LUTs can be associated with specific values (key configuration values) of the qualitative image factors relating to captured and/or computed image data for an image frame, such as sensor gain, exposure time, cumulative color temperature (CCT), white balance, luminance, etc. The specific factors used can depend, at least, on the particular camera implementation. The predetermined LUTs can include configuration information for an image processing stack (e.g., of the ISP) based on, or corresponding with conditions of a scene depicted in a captured image frame and/or based on predetermined use cases, where different conditions and different use cases correspond to different ISP configuration information, such as different key configuration values of the LUTs, each LUT being associated with specific ISP configuration information so that an LUT is selectable (e.g., for use in an interpolation operation) depending on a condition of a scene and/or a use case.

In another general aspect, a method can include storing, in memory of a computing device, a plurality of predetermined lookup tables (LUTs), a first LUT of the predetermined LUTs including first image signal processor (ISP) configuration information corresponding with a first value of a quantitative image factor, and a second LUT of the predetermined LUTs including second ISP configuration information corresponding with a second value of the quantitative image factor. The second value can be greater than the first value. The method can further include receiving, at a LUT processing circuit, an interpolation command indicating (including, specifying, etc.) a third value of the quantitative image factor corresponding with an image frame received by the ISP. The third value can be greater than the first value and less than the second value. The method can still further include, in response to receiving the interpolation command: reading, by the LUT processing circuit, the first LUT and the second LUT; performing an interpolation operation using the third value, the first LUT and the second LUT to generate an interpolated LUT; and writing the interpolated LUT to at least one of the memory or a configuration register of the ISP.

The details of one or more implementations are set forth in the accompanying drawings and the description below. Other features will be apparent from the description and drawings, and from the claims.

BRIEF DESCRIPTION OF THE DRAWINGS

FIG. 8 shows an example of a computer device and a mobile computer device that can be used to implement the techniques described here.

Like reference symbols in the various drawings indicate like elements.

DETAILED DESCRIPTION

To address the drawbacks discussed above, such as limited image processing performance and power consumption, the approaches described herein use hardware apparatuses, such as lookup table (LUT) processing circuits and/or LUT hardware engines (LUT engines) to perform LUT processing operations, such as interpolation operations (e.g., bilinear interpolation operations, trilinear interpolation operations, etc.), operations to perform packing (transformation, translation, etc.) of LUTs (e.g., to configure them for specific image signal processor (ISP) hardware configuration registers), etc.

Such approaches can achieve a significant reduction in an amount of general purpose processor cycles (e.g., of a mobile electronic device including a camera implementation such as those described herein) used in image processing (by a camera software (SW) driver). Further, these approaches can reduce power consumption by the associated general purpose processor (and overall power consumption of an electronic device implementing such approaches) by performing computationally intensive operations (e.g., interpolation operations) using a special purpose LUT processing circuit or LUT engine, such as the example implementations described herein. For instance, executing arithmetic operations on a general-purpose CPU (such as for LUT interpolation, etc.) can consume more power than the same operations performed on fixed-function hardware (e.g., an LUT processing circuit) specifically designed to perform (execute, etc.) such operations. For instance, general-purpose CPUs can consume more power because they utilize a complex, generic execution pipeline for instruction fetch-decode-execute sequences. Therefore, an LUT interpolation process (operation, etc.), when performed using a general purpose CPU, will be performed as a series of general CPU instructions that are processed this execution pipeline.

In contrast, specialized hardware (e.g., the LUT processing circuits and/or LUT engines described herein), may not include a complex pipeline and, instead, can be configured to perform a set of fixed-functions in hardware that does not require complex programming and, therefore, can be implemented using less complicated circuitry than a general purpose CPU. Such less complicated circuit can include significantly less hardware gates than are used in general purpose CPU, which, as a result, uses less power (e.g., less power per operation.) Further, the implementations described herein can also significantly improve image signal processing performance, allowing for improvements in image quality (e.g., as a result of possible additional image processing), increases in frame rates for captured image frames, and so forth.

Figure 1:
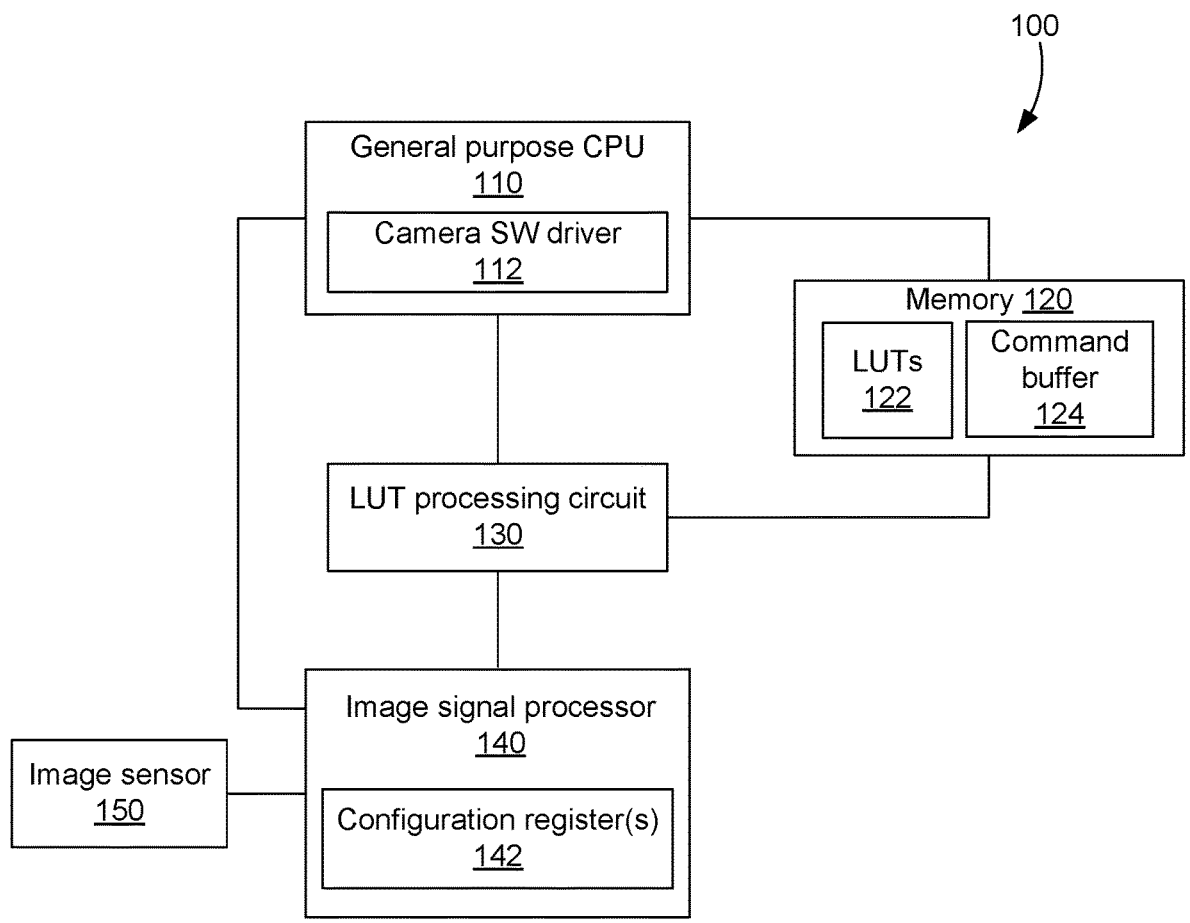
FIG. 1 is a block diagram illustrating a camera that can be included, for example, in a mobile computing device, such as a smartphone.

FIG. 1 is a block diagram illustrating a camera 100 (e.g., a digital camera) that can be included, for example, in a mobile computing device, such as the smartphone 882 shown in FIG. 8 below. The camera 100 can, of course, be implemented in other electronic devices, such as tablet computers, notebook computers, laptop computers, action cameras, body cameras, etc. The elements of the camera 100 (as well as the elements of other camera implementations described herein) are given by way of example and for purposes of illustration. It will be appreciated that, a camera implementing the approaches described herein can, include other elements, can have elements replaced with different elements, can have multiple elements combined into a single integrated element, can have elements omitted, and so forth.

As shown in FIG. 1, the camera 100 includes a general purpose processor 110 (e.g., a general purpose CPU), a memory 120, such as dynamic random access memory (DRAM), a LUT processing circuit 130, an ISP 140, and an image sensor 150 (e.g., a CMOS sensor, a charge-coupled device (CCD) sensor, etc.). In FIG. 1, communication paths (operational couplings) are shown between various elements of the camera 100. These communication paths are illustrative and, in some implementations, other communication paths or operational relationships can be included or defined in the camera 100.

The camera 100 of FIG. 1 includes a camera SW driver 112 running on the general purpose processor 110. In this example, the camera SW driver 112 can be configured, e.g., as part of an initialization process, to store, in the memory 120, a plurality of predetermined lookup tables (LUTs) as part of the LUTs 122. For instance, the camera SW driver 112 can be configured to store lookup tables that have been previously generated (e.g., by image quality engineers) and that include ISP configuration information for various aspects of image capturing and processing by the ISP 140 and/or the image sensor 150. For instance, these predetermined LUTs can be associated with specific values (key configuration values) of qualitative image factors relating to captured and/or computed image data for an image frame, such as sensor gain, exposure time, cumulative color temperature (CCT), white balance, luminance, etc. The specific factors used will depend, at least, on the particular camera implementation. In some implementations, the LUTs 122 can also include intermediate interpolated LUTs, which are written by the LUT processing circuit 130 and used in interpolations where more than one factor (and multiple interpolation operations) is (are) used to generate an interpolated LUT (e.g., ISP configuration data) that is written to the configuration registers 142 for use by the ISP 140. Depending on the particular implementation, such LUTs (predetermined LUTs and/or interpolated LUTs) can be one-dimensional, two-dimensional, and/or three-dimensional, and can include integer values, floating point values, etc.

Such predetermined LUTs can include configuration information for the image processing stack (e.g., of the ISP 140) that can correspond with specific conditions of a scene depicted in a captured image frame and/or with specific use cases, where different conditions and different use cases correspond to different key configuration values of the LUTs, each LUT being associated with a specific key configuration value so that an LUT is selectable (e.g., for use in an interpolation operation) depending on a condition of a scene and/or a use case. In particular, the predetermined LUTs can include configuration information for the image processing stack (e.g., of the ISP 140) based on various (e.g., potential) scene conditions and/or use cases (e.g. cloudy, sunny, video, preview, etc.) corresponding, for each predetermined LUT, with a respective key configuration (factor) value of the set of key configuration values for each different factor that is used by a given implementation. However, in some implementations, because such scene factors are continuous variables, interpolation between the predetermined tables may need to be performed when a computed factor for a captured image frame is between key values (e.g., greater than one key factor value and less than a second key factor value) for corresponding predetermined lookup tables. In the camera 100 (and similarly in the camera 400 of FIG. 4 and the camera 500 of FIG. 5), such interpolation operations can be performed by the LUT processing circuit 130 (the LUT processing circuit 430, or the LUT engine 530), e.g., using one or more special purpose LUT arithmetic and logic units (ALUs), such as are further described below.

As shown in FIG. 1, the memory 120 can also include a command buffer 124, which can receive LUT processing commands (e.g., interpolation commands, bitwise operation commands, shift commands, etc.) from the camera SW driver 112. The LUT processing circuit 130 can then read commands for execution from the command buffer 124 and perform associated LUT operations (e.g., using special purpose LUT ALUs included in the LUT processing circuit 130).

The ISP 140 of the camera 100, as shown in FIG. 1, includes configuration registers 142, which can be used to store LUTs (e.g., interpolated LUTs) that include configuration information (e.g., corresponding with qualitative images factors that were determined based on a previously captured image frame) to capture and process a next image frame. In some implementations, the LUTs stored in the configuration registers 142 can be updated after each image frame is captured. That is, LUT processing, such as described herein, can be performed for every frame in a sequence of captured image frames and configuration information in the configuration registers 142 for the ISP 140 can be updated after each image frame capture. For instance, if the camera 100 captures image frames at 60 frames per second (fps), interpolation for all configuration LUTs (using one or more factors) can be performed 60 times per second (after each image frame is captured) and the configuration registers 142 can be updated with the newly interpolated LUTs. For instance, LUTs used in image processing can each include hundreds of values, or more, and multiple LUTs can be used for processing each image (e.g., at a frame capture rate). As an example, for an LUT that includes 1000 entries, interpolation of that one LUT would involve 60,000 interpolation calculations per second (e.g., 60×1000, for an image frame capture rate of 60 fps). The number of calculations can be further multiplied in implementations where LUT interpolation is cascaded. For instance, if tri-linear interpolation is performed, seven interpolation operations can be performed to produce a final interpolated LUT (e.g., with each interpolation operation including sixty-thousand calculations using the above example).

Figure 2:
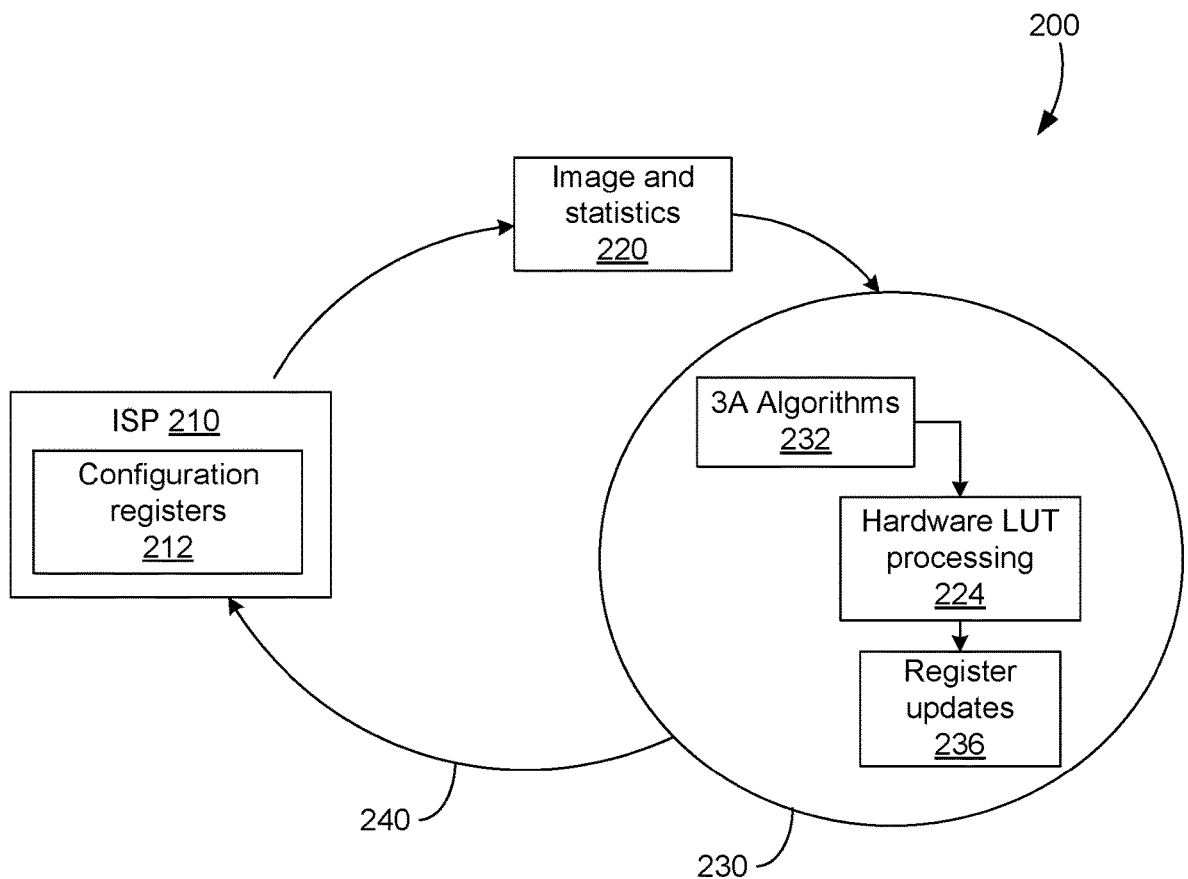
FIG. 2 is a block/state diagram illustrating operation of camera, including hardware lookup table (LUT) processing.

FIG. 2 is a block/state flow diagram 200 illustrating operation of a camera that includes hardware lookup table (LUT) processing, such as described herein. In some implementations, the state flow diagram 200 can be implemented by the cameras disclosed herein (e.g., the cameras 100, 400 and 500). However, for purposes of discussion of FIG. 2, the state flow diagram 200 will be described generally, without specific reference to any particular camera implementation.

As shown in FIG. 2, the state flow diagram 200, which implements a feedback loop, can include an ISP state 210 that operates based on configuration information (e.g., LUTs) stored in configuration registers 212. In the state flow diagram 200, at the ISP state 210, an image frame (e.g., pixel data for the image frame) can be captured and statistics on the captured image frame can be determined, which can then be communicated as image and statistics 220 for processing and analysis at state 230.

At state 230, auto-tuning algorithms (e.g., auto-focus, auto-exposure and auto-white-balance), which can be referred to as 3A algorithms 232, can be performed on the image and statistics 220 (e.g., by a camera SW driver). The 3A algorithms 232 can be configured to calculate qualitative image factors (for each captured image frame), such as the image factors described herein. The calculated image factors can then be used, as part of LUT hardware processing 234, to generate (and in some implementations, pack or transform) LUTs that adjust the configuration information included in the configuration registers 212 based a current scene (as represented by the image and statistics 220). This updated (adjusted) configuration information can be included in register updates 236. The register updates 236 can then be communicated to the configuration registers 212 via a feedback path 240, and the process of the state flow diagram 200 can be repeated for a new (next) captured image frame.

As described herein, the LUT hardware processing 234 can include performing LUT interpolation operations on various LUTs (e.g., predetermined LUTs and/or intermediate interpolated LUTs). Depending on the particular implementation, each LUT that is used at the ISP state 210 (e.g., that is stored in the configuration registers 212) can be interpolated using one or more qualitative image factors, such as using the approaches described herein.

In addition to LUT interpolation operations, the LUT hardware processing 234 can include performing packing operations on one or more LUTs (e.g., interpolated LUTs). For instance, in some implementations, camera ISP hardware can require LUTs including configuration information to be in a specific format and/or arrangement. For example, in some implementation, specific ISP hardware can expect different bit widths LUT entries, or that more than one LUT be packed (merged) into a single (combined) LUT. In some implementations, each LUT entry of such a packed or merged LUT could include different values from the LUTs that are packed (merged) together. Packing operations on LUTs can be performed using arithmetic operations, bitwise (logical) operations, and/or shift operation. Accordingly, special purpose LUT ALUs that are used for performing interpolation operations can also be configured to perform LUT packing operations.

Figure 3A:
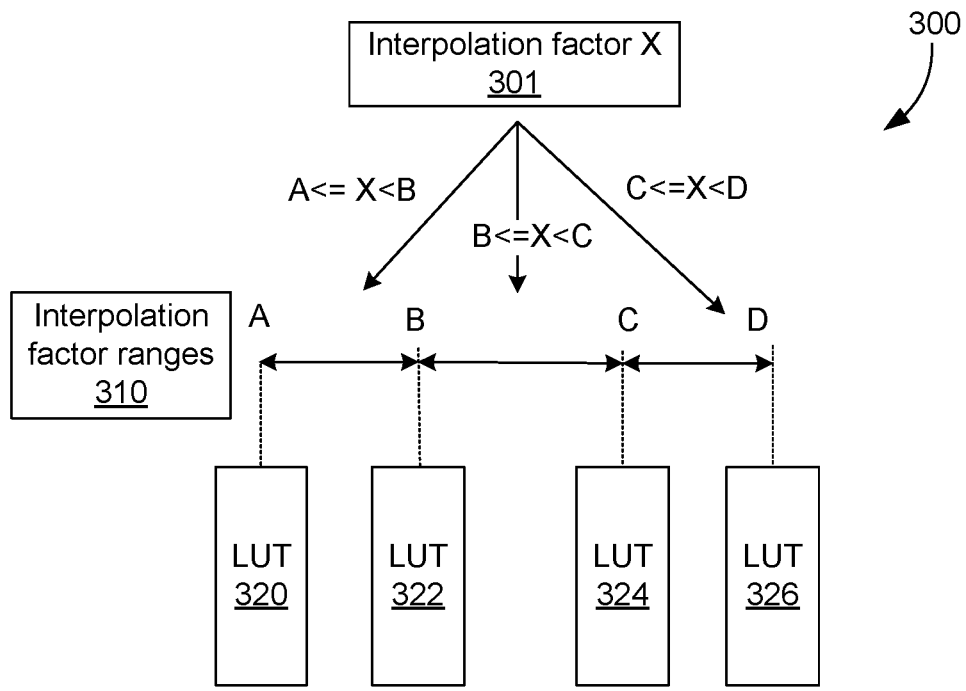
FIGS. 3A and 3B are diagrams illustrating an example process of LUT interpolation that can be implemented by an LUT processing circuit.
Figure 3B:
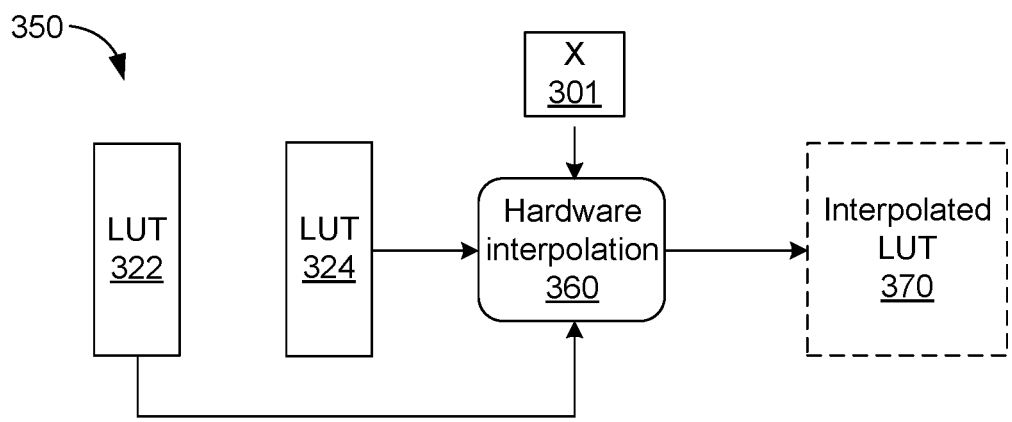

FIGS. 3A and 3B are diagrams, 300 and 350 respectively, that illustrate an example process of LUT interpolation that can be implemented by an LUT processing circuit. The LUT interpolation process shown in FIGS. 3A and 3B illustrates LUT interpolation for a single value of one qualitative image factor X (e.g., an interpolation factor X 301), which can be a value of a qualitative image factor, such as those factors described herein. It will be appreciated, however, that the process of FIGS. 3A and 3B (or a similar process) can be implemented to perform a second interpolation operation based on a second qualitative image factor to produce a final interpolated LUT that is used as configuration information for an ISP. Such multifactor LUT interpolations can be performed in a number of manners, such as using a hierarchical flow to generate intermediate LUTs from predetermined LUTs, and then using intermediate LUTs and/or other predetermined LUTs to generate a final interpolated LUT that is written to configuration registers of an associated ISP. In some implementations, values of qualitative image factors (e.g., key values and interpolation factors) can be normalized to have values between zero and one, though other approaches can be used.

As indicated above, FIGS. 3A and 3B illustrate an LUT interpolation process using a value of an image factor X (e.g., the interpolation factor X 301). In this example, the interpolation factor X 301 can be used, depending on the computed value of the interpolation factor X 301, as a ratio for interpolating (e.g., bilinear interpolation) between configuration information included in predetermined LUTs 320, 322, 324 and 326. In the example, the predetermined LUTs 320, 322, 324 and 326 are respectively associated with key values of A, B, C and D of the factor X, as is shown in FIG. 3A. As is also shown in FIG. 3A, the key values A, B, C and D, for this example, define interpolation factor ranges 310 illustrated by the horizontal, doubled-ended arrows in FIG. 3A. For instance, a first interpolation factor range is between A and B, a second interpolation factor range is between B and C, and a third interpolation factor range is between C and D. In this example A<B<C<D and X is between B and C. That is B<X<C.

Accordingly, as shown by the diagram 350 of FIG. 3B, for this example, because the image factor X falls within the interpolation factor range between key values B and C, interpolation between the predetermined LUT 322 associated with the key value B and the predetermined LUT 324 associated with the key value C is performed using the interpolation factor X 301. That is, in this example, the interpolation factor X 301 can being used as a ratio for performing (bilinear) hardware interpolation 360 on the predetermined LUTs 322 and 324 to produce an interpolated LUT 370 (which can be an intermediate interpolated LUT or a final interpolated LUT that is used to update ISP configuration registers. In some implementations, such bilinear interpolation can be performed by special purpose LUT ALUs that can be configured to perform bilinear interpolation computations, such as discussed below with respect to, at least, FIG. 4.

Figure 4:
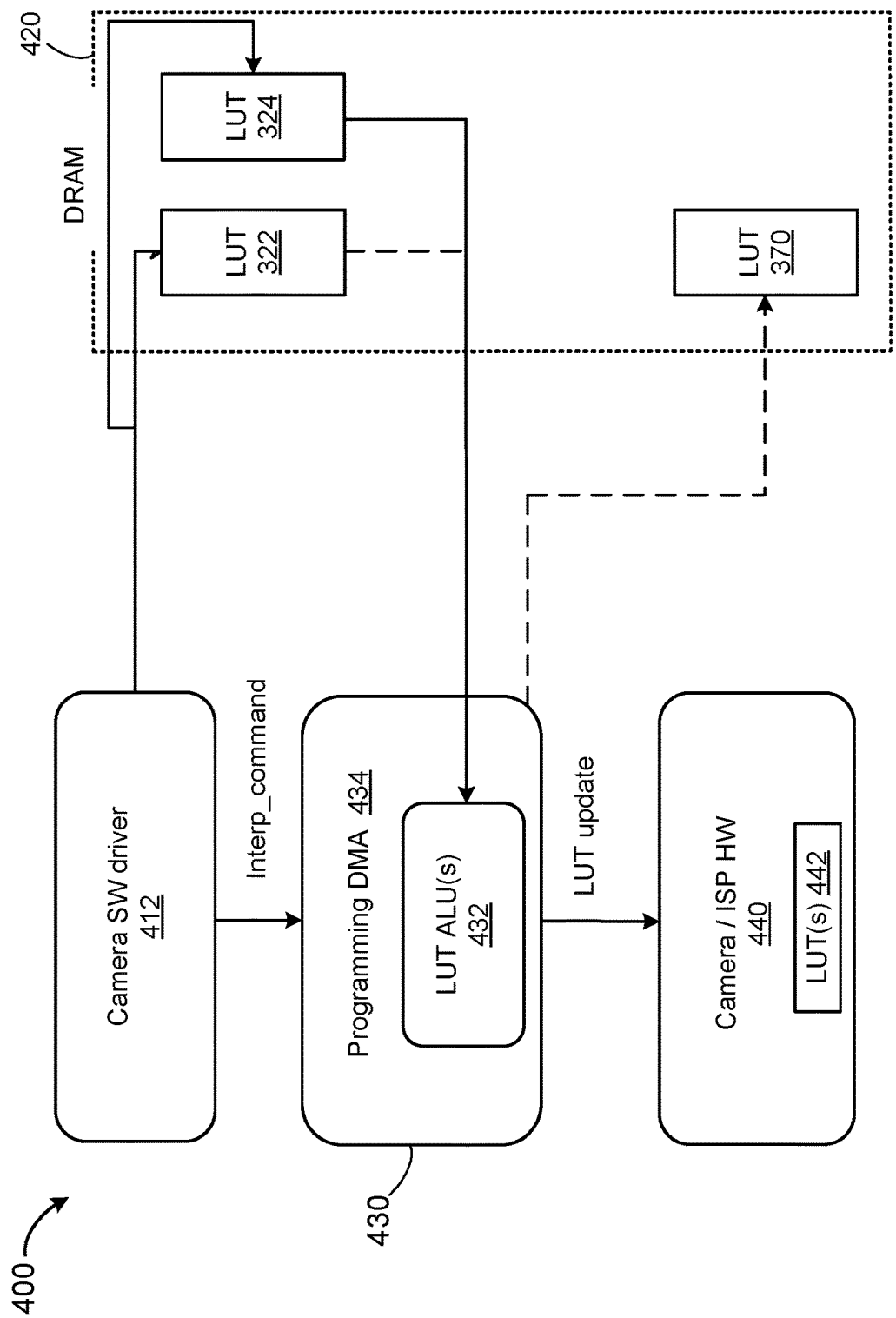
FIG. 4 is a block diagram illustrating an implementation of a camera including an LUT processing circuit.

FIG. 4 is a block diagram illustrating an implementation of a camera 400 including an LUT processing circuit 430 (LUT processing hardware). As with the camera 100, the camera 400 includes a camera SW driver 412 (e.g., running on a general purpose processor), memory 420 (DRAM) and camera/ISP hardware 440. Also, as discussed with respect to the camera SW driver 112 of the camera 100, the camera SW driver 412 can be configured to write a plurality of predetermined LUTs, such as the LUTs 322 and 324 of the example of FIGS. 3A and 3B, e.g., as part of an initialization process of the camera 400. In some implementations, the camera SW driver 412 can also be configured to issue an interpolation command (Interp_command) or other LUT processing commands, which can be directly communicated to the LUT processing circuit 430 or, as discussed herein, could be placed in a command buffer in the memory 420, and then read from the command buffer by the LUT processing circuit 430 prior to execution. Further referring to the LUT interpolation example of FIGS. 3A and 3B, the interpolation command issued by the camera SW driver 412 for performing such an interpolation operation could take the form of:

op(Interp, x, LUT1_addr, LUT2_addr, dst_LUT), where x is the interpolation factor X 301, LUT1_addr is the address of the predetermined LUT 322, LUT2_addr is the address of the predetermined LUT 324, and dst_LUT is the address of the intermediate LUT 370 and/or the address in the configuration LUTs 442 (configuration registers) of the camera/ISP hardware 440 of the camera 400 for writing the interpolated LUT.

In response to receiving the interpolation command (e.g., from the camera SW driver 412 or a command buffer in the memory 420), the LUT processing circuit 430 can be configured to read the LUT 322 and the LUT 324 from the memory 420, e.g., using a programming direct memory access (DMA) controller (programming DMA 434). In some implementations, the LUT processing circuit 430 can be implemented in a programming DMA (the programming DMA 434), or a limited programming DMA can be implemented as part of the LUT processing circuit 430. In some implementations, a programming DMA can be excluded, and the LUT processing circuit 430 can include a read DMA and a write DMA for, respectively accessing (reading) LUTs and writing LUTs.

In the example implementation of FIG. 4, the programming DMA 434 can be a specialized DMA that can read and execute register programming commands that are stored in memory. For instance a register command can be a register write, poll, etc. command (e.g. write_register(register_address, value)), which can direct the DMA to perform an operation on the register space of the ISP hardware (e.g., writing/polling of ISP hardware registers without direct intervention of a main CPU). For instance, in some implementations, one supported command of the programming DMA 434 can be to accept an address of an LUT the memory 420 (e.g., an address of the LUT 370) that is to be written to a hardware LUT (e.g., an ISP configuration LUT 442) and coordinate writing of the LUT, taking into account any dependencies (e.g., waiting from the LUT to be generate before initiating writing the LUT).

As shown in FIG. 4, one or more special purpose LUT ALUs 432 can be implemented in the LUT processing circuit 430. In this example, after reading the LUTs 322 and 324, the LUT ALUs 432 can perform interpolation operations (computations, operations, etc.) consistent with the interpolation command issued by the camera SW driver 412 to generate an interpolated LUT. These operations, depending the number of LUT ALUs 432, can be performed sequentially and/or in parallel. In this example, each entry of the interpolated LUT can be computed from corresponding entries in the LUTs 322 and 324, and the interpolation factor X 301 using the following equation:

$$\text{LUT\_out\_val}=\text{LUT1\_val}*x+\text{LUT2\_val}*(1-x)—$$
Where $0<=x<=1$, In the above equation, LUT_out_val represents values of the interpolated LUT being generated, LUT1_val represents corresponding values in the LUT 322, x represents the interpolation factor X 301, and LUT2_val represents corresponding values in the LUT 324. As discussed above, in this example, the values of the qualitative image factor (key values corresponding with the LUTs, and the interpolation factor X) can be normalized to be between 0 and 1, though specific values (e.g., ISP configuration values) included in the LUTs may not be normalized. In some implementations, additional interpolation commands, or other LUT processing commands (e.g., packing commands) can be received by the LUT processing circuit 430 (e.g., directly from the camera SW driver 412 or read from a command buffer in the memory 420). Once the commands for generating a final interpolated LUT are completed, the final interpolated LUT can be written as a configuration LUT to the LUT storage are 442 of the camera/ISP hardware 440.

For instance, in some implementation, multiple interpolation commands for generating an interpolated LUT using multiple interpolation operations and interpolation factors (computed values of qualitative images factors based on a captured image frame) can be expressed as a chained command. For instance, a command for generating an interpolated LUT based on multiple image factor (interpolation) values, e.g., one interpolation operation based on sensor gain (e.g., taking sensor gain into account) and another interpolation operation based on luminance (e.g., taking luminance into account) can be issued by the camera SW driver 412 as a chained command in the form of:

op(Interp,x,lut1,lut2,lut3_out)→op(Interp,y,lut3_out, lut4,lut_out)→op(write_lut,lut_register,addr, lut_out), Where, in this example, lut1 and lut2 are interpolated using the interpolation factor x to generate an intermediate interpolated LUT lut3_out. After lut3_out is generated, the LUT processing circuit 430 can, in accordance with the above chained command, interpolate between lut3_out and lut4 using the interpolation factor y to generate the final interpolated LUT lut_out, and then lut_out can be written to lut_register_addr (e.g., in the LUT registers 442 of the camera 400).

Using such command chaining can allow for the camera SW driver 412 to express all requested interpolation operations for a captured image frame as a sequence of interpolation commands that can be interwoven with other register programming commands expressed by the camera SW driver 412. In some implementations, such as in the camera 400, dependencies between the LUT commands (e.g., interpolation and packing commands) and ISP configuration register write commands can be enforced by the LUT processing circuit 430, e.g., such as by using a wait for interrupt request feature (e.g., wait for irq) of the programming DMA 434.

Figure 5:
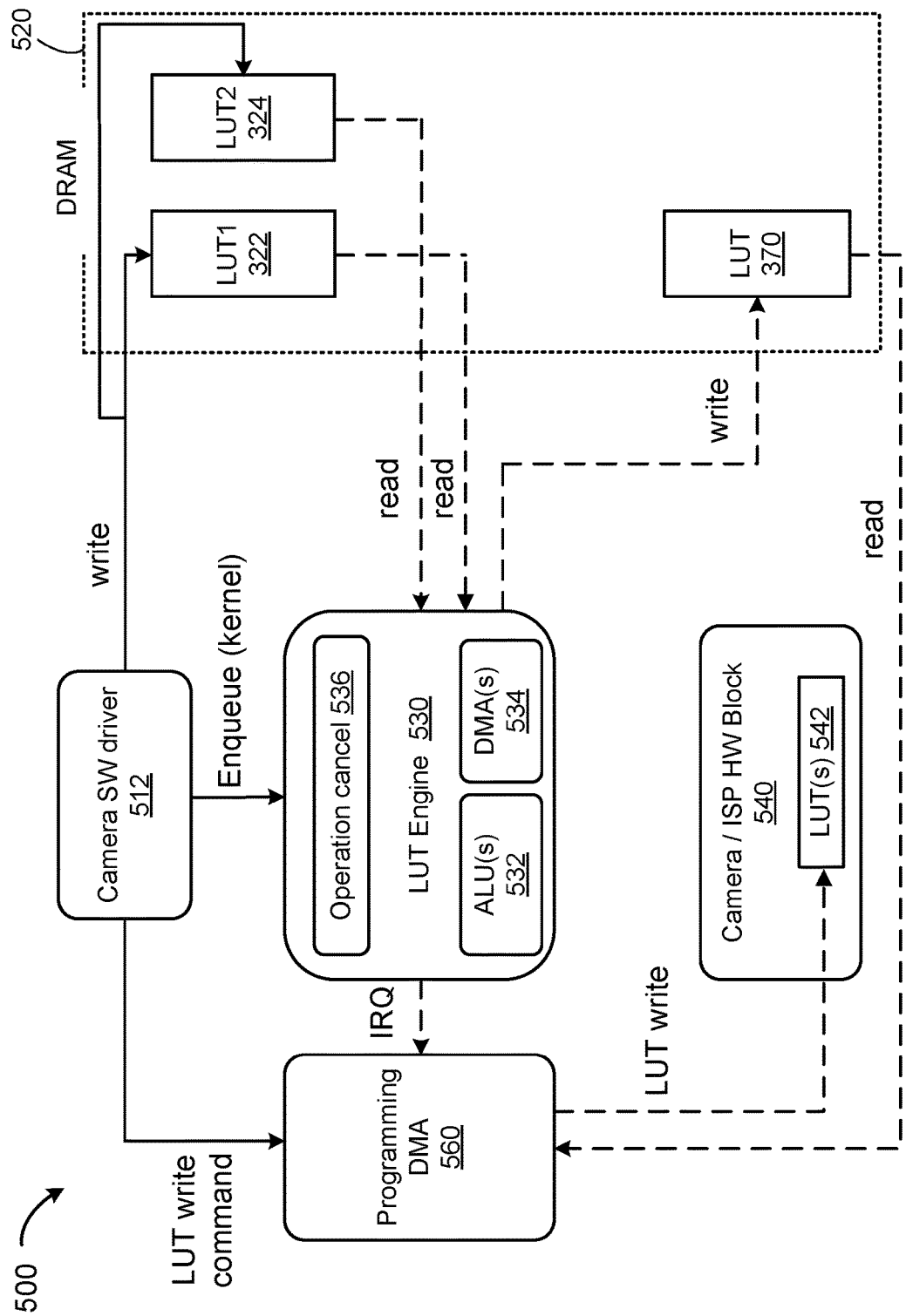
FIG. 5 is a block diagram illustrating another implementation of a camera including an LUT processing circuit.

FIG. 5 is a block diagram illustrating another implementation of a camera 500 including an LUT processing circuit (LUT engine 530). As with the cameras 100 and 400, the camera 500 includes a camera SW driver 512 (e.g., running on a general purpose processor), memory 520 (DRAM) and camera/ISP hardware 540 (including configuration LUTs 542). Also, as discussed with respect to the camera SW driver 112 of the camera 100 and the camera SW driver 412 of the camera 400, the camera SW driver 512 can be configured to write a plurality of predetermined LUTs, such as the LUTs 322 and 324 of the example of FIGS. 3A and 3B, e.g., as part of an initialization process of the camera 500. In some implementations, the camera SW driver 512 can also be configured to issue an interpolation command (Interp_command) or other LUT processing commands, which can be directly communicated to the LUT engine 530 or, as discussed herein, could be placed in a command buffer in the memory 520, and then read from the command buffer by the LUT engine 530 prior to execution.

In some implementations, the camera SW driver 512, the memory 520 and the camera/ISP hardware 540 can operate similar to the corresponding elements of the camera 400. Accordingly, for purposes of brevity and clarity, those elements of the camera 500 will not be described in further detail again with respect to FIG. 5.

As can be seen from a comparison of FIG. 5 with FIG. 4, the camera 500 can differ from the camera 400 in at least the following ways. For instance, the LUT engine 530 is implemented as a standalone LUT processing circuit from a programming DMA 560 of the camera 500. Further, the LUT engine 530, as compared to the LUT processing circuit 430, includes, in addition to the LUT ALUs 532, DMAs 534 and an operation control circuit 536. In some implementations, the DMAs 534 can include at least one basic read DMA for accessing LUTs in the memory 520, and a basic write DMA for writing LUTs to the/520, or to the LUT configuration register 542 of the camera/ISP hardware 540.

The LUT engine 530 of the camera 500 can be configured to work in conjunction with the programming DMA 560, e.g., to coordinate writing of LUTs to the configuration LUTs 542. For instance, the LUT engine 530 can be configured to send an interrupt request IRQ to the programming DMA 560 when an interpolated (and packed) LUT is ready to be written to the configuration LUTs 542 of the camera/ISP hardware 540.

In some implementations, the operational control circuit 536 can be configured to decode more complicated command structures than the LUT processing circuit 430. For instance, the operation control circuit 536 can be configured to decode and schedule execution of operations of the compute kernel 600 illustrated in FIG. 6. As a result, supported LUT processing operations of the LUT engine 530 can be more complicated, flexible and computationally sophisticated than supported LUT processing operations of the LUT processing circuit 430. Further, the operation control circuit 536 can also be configured to initiate operations of the programming DMA 560 (e.g., via interrupt requests), as well as schedule compute kernel execution (computations) on available ALUs of the LUT ALUs 532. As discussed herein, the LUT ALUs 532 can include a plurality of parallel implemented special purpose LUT ALUs that are configured to execute (perform) LUT processing operation (e.g., interpolation operations, bitwise operations, shift operations, etc.) for processing LUTs for use in image processing (e.g., to generate configuration LUTs for use by the camera/ISP hardware 540 of the camera 500).

Figure 6:
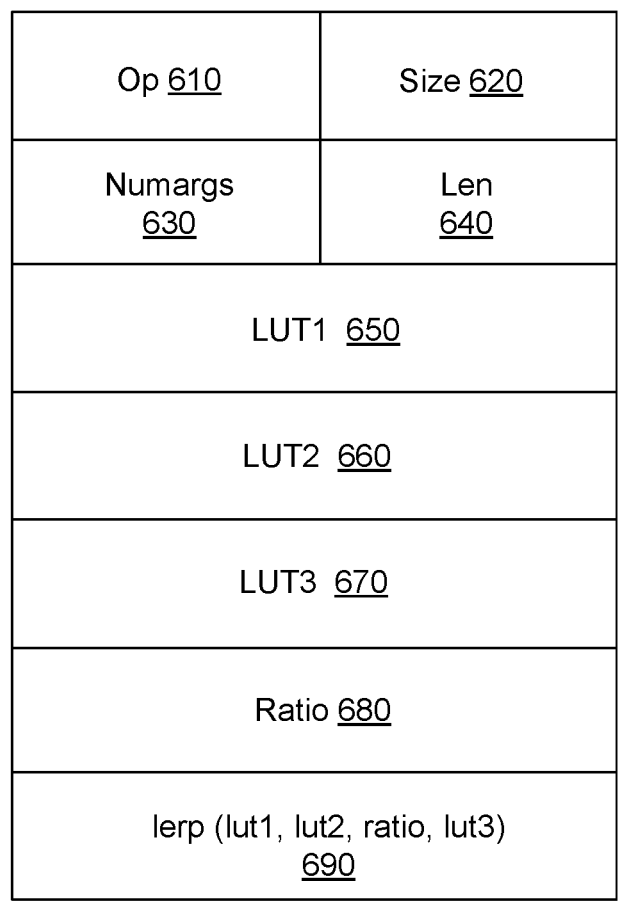
FIG. 6 is a diagram of a compute kernel that can be executed by, for example, the camera of FIG. 5.

FIG. 6 is a diagram of a compute kernel 600 that can be implemented in, for example, the camera of FIG. 5. In other implementations, a compute kernel that is executed by an LUT processing circuit, such as the LUT engine 530 of FIG. 5, can have other forms. For instance, for purposes of example and illustration, the compute kernel 600 incudes only a single instruction (e.g., an interpolation instruction using a single interpolation factor). In other instances, the compute kernel 600 could include multiple (e.g., chained) interpolation instructions based on multiple interpolation factors, bitwise (logical) instructions, shift instructions, etc. The specific instructions and fields included in such a compute kernel will depend on the specific implementation and/or the instructions an LUT processing circuit (e.g., the LUT engine 530) is being instructed to execute.

For the compute kernel 600, with further reference to the camera 500 of FIG. 5, in this example, the camera SW driver 512 can generate the compute kernel 600 (as well as other compute kernels and instructions that are sent to the programming DMA 560, such as ISP configuration register write instructions). The camera SW driver 512 can then communicate the compute kernel 600, as well as other compute kernels, to the LUT engine 530. The operation control circuit 536 can schedule (control, direct, etc.) execution of any compute kernels received from the camera SW driver 512 (e.g., using the special purpose LUT ALUs 532 and the DMAs 534, which can include one or more read DMAs and one or more write DMAs).

As illustrated by the compute kernel 600 of FIG. 6, such compute kernels can have a simple format. However, as noted above, such compute kernels (e.g., the compute kernel 600) can be extended to include additional operations, which can be used in conjunction with adding and/or changing functionality and/or capabilities of an LUT engine (e.g., the LUT ALUs 532 of the LUT engine 530).

In some implementations, LUT compute kernels can be executed using element-wise computations. That is, a compute kernel, such as the compute kernel 600, can be executed by performing computations (e.g., interpolation computes) one at a time (e.g., using single corresponding entries from multiple LUTs, such as predetermined LUTs, and/or intermediate interpolated LUTs). Accordingly, using the approaches described herein, parallelization of LUT processing operations can be implemented by scheduling, e.g., by the operation control circuit 536, such element-wise computations across multiple, parallel implemented LUT ALUs 532 for concurrent processing of interpolation (or other) computations. In an example implementation, the LUT engine 530 could be used to interpolate between predetermined LUTs 522 and 524 using a computed interpolation factor (ratio) X. In this example, each of the predetermined LUTs can include one-thousand entries. If the LUT engine 530 of the camera 500 includes one-thousand special purpose LUT ALUs 532, interpolation (e.g., bilinear interpolation) between the LUTs 522 and 524 could then be completed in a single operation cycle, with each of the one-thousand LUT ALUs 532 concurrently completing a single element-wise interpolation computation. Accordingly, parallelization using multiple ALUs can be used to further improve image processing capabilities (power, bandwidth, speed, etc.).

Referring again to FIG. 6, the elements of the example compute kernel 600 are briefly described below. As shown in FIG. 6, the compute kernel 600 is illustrated using a binary layout of a linear interpolation compute kernel that the LUT engine 530 can execute (e.g., as administered by the operation control circuit 536). As noted above, the compute kernel 600 is given by of example, and for purposes of illustrating a compute kernel for a single command. In some implementations, additional fields related to additional commands (e.g., for additional interpolation operations, LUT packing operations, etc.) can be included in such a compute kernel.

In the example of FIG. 6, the compute kernel 600 includes an Op field 610, a size field 620, a numargs field 630, a len field 640, a first (lut1) address field 650, a second (lut2) address field 660, a third (lut3) address field 670, a ratio (factor) 680 and an operation (Ierp) field 690, that lists the fields 650, 660, 670 and 680 as arguments. In this example, the op field 610 can identify the type of command(s) included in the compute kernel 600. The size field 620 can specify the total size (e.g., in bytes, etc.) of the compute kernel 600. The numargs field 630 can specify a number of argument entries for the compute kernel 600. The len field 640 can specify a number of the kernel computation entries for the compute kernel 600.

For this example, which can be for a bilinear interpolation operation, the first address field 650 can be a memory address of a first input LUT (e.g., LUT 522). The second address field 660 can be a memory address of a second input LUT (e.g., LUT 524). The third address field 650 can be an address of an output LUT (e.g., an intermediate interpolated LUT 570) and/or an address of an ISP configuration (final interpolated) LUT 542, e.g., in configuration registers of the ISP 540. The ratio field 680 can be an interpolation factor (e.g., X), such as those discussed herein. And the operation field 690 can be, in this example, a bilinear interpolation opcode (Ierp) that is executable (e.g., directly executable) by the special purpose LUT ALUs 532.

Figure 7:
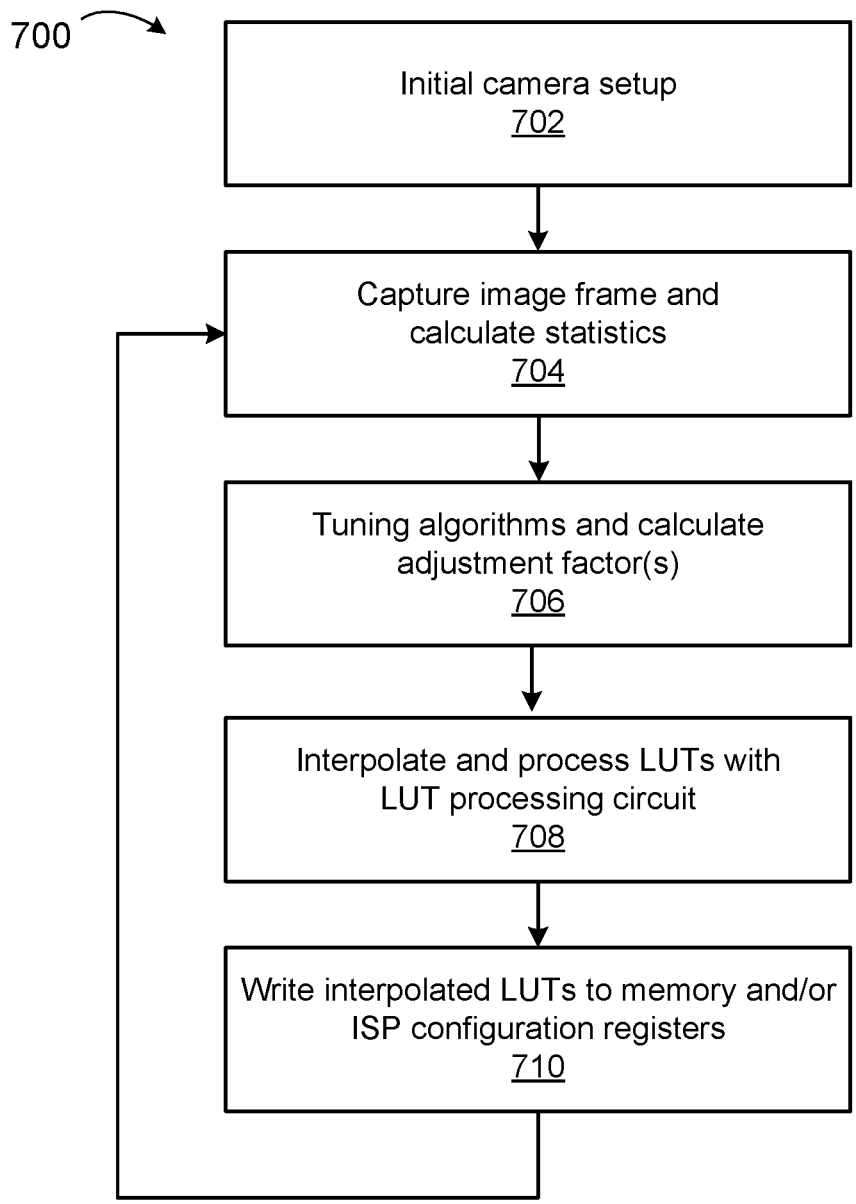
FIG. 7 is a flowchart illustrating a method for image processing that can be implemented, for example, by the cameras of FIGS. 1, 4 and 5.

FIG. 7 is a flowchart illustrating a method 700 for image processing that can be implemented, for example, by the cameras of FIGS. 1, 4 and 5. It will be appreciated, however, that the method 700 can be implemented by cameras having other configurations. For purposes of discussion and illustration, the method 700 will be described with further reference to, at least, FIG. 1 and FIG. 2.

The method 700 includes, at block 702, performing an initial camera setup. For instance, in the camera 100, at block 702, the camera SW driver 112 can write a plurality of predetermined LUTs (e.g., LUTs 122) to the memory 120, such as the predetermined LUTs as described herein (e.g., predetermined LUTs for adjusting chrominance, luminance, gamma, brightness, etc.). Further, the camera SW driver 112 can instruct the LUT processing circuit 130 (or other circuit, such as a programming DMA) to write (copy, store, etc.) initial LUTs in the configuration registers 142 of the ISP 140, as an initial image frame capture configuration. In other implementations, the initial setup at block 702 can be performed in other ways.

At block 704, the method 700 includes capturing an image frame including the image and statistics 220 (e.g., pixel data and quantitative values corresponding with the captured image frame, such as brightness, video, preview, etc.). The ISP 140 can provide the statistics 220 to the camera SW driver 112, which can execute the 3A algorithms 232 on the image and statistics 220 and determine one or more value of qualitative image factors that can by used to adjust the configuration of the ISP 140 based on the captured scene of the image of the image and statistics 220.

At block 706, the camera SW driver 112 can, based on the calculated factors, send one or more interpolation commands and/or other LUT processing commands (e.g., packing operations) to the LUT processing circuit 130, such as in the form of a single interpolation operation, a chained interpolation operation, a compute kernel (such as the compute kernel 600), and so forth. As noted above, the factors computed can depend on the specific camera implementation and/or on the image and statistics 220 of the captured frame. For instance, the factors can include values (e.g., to be used to adjust the ISP 140 configuration) corresponding with sensor gain, exposure time, cumulative color temperature, white balance, etc.

At block 708, the LUT processing circuit 130 can then execute the interpolation commands (e.g., by executing interpolation operations) and/or the other LUT processing commands (e.g., packing operations), such as using the approaches described herein, or using other approaches as appropriate for a specific implementation. For instance, LUTs that will be used in the interpolation operations can be read from the memory 120 using an identity operation and one or more LUT ALUs can perform LUT processing in correspondence with the commands (and factors) received from the camera SW driver 112. As noted herein, multiple LUT interpolation operations can performed in generating a single interpolated LUT that is ultimately written to the ISP 140's configuration registers 142.

After completion of LUT processing by the LUT processing circuit 130 at block 708, the method 700 includes, at block 710, writing interpolated and processed LUTs (e.g., intermediate or final LUTs) to the memory 120 and/or the configuration registers 142 to update the configuration information for the ISP 140. As shown, in FIG. 7, after completion of the operations of block 710, the method 700 can return to block 704, and another image frame capture and LUT processing sequence (blocks 704 to 710) can be performed (e.g., where this sequence is repeated at a frame rate of the associated camera, such as 30 FPS, 60 FPS, etc.).

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A camera comprising:
 a dynamic memory;
 an image signal processor, ISP, including a configuration register;
 a software driver configured to:
  store, in the dynamic memory, a plurality of predetermined lookup tables, LUTs, a first LUT of the predetermined LUTs including first ISP configuration information corresponding with a first value of a quantitative image factor, and a second LUT of the predetermined LUTs including second ISP configuration information corresponding with a second value of the quantitative image factor, the second value being greater than the first value; and
  issue an interpolation command indicating a third value of the quantitative image factor corresponding with an image frame received by the ISP, the third value being greater than the first value and less than the second value; and
 a LUT processing circuit configured to receive the interpolation command, and in response to receiving the interpolation command:
  read the first LUT and the second LUT; and
  perform at least one interpolation operation to generate an interpolated LUT, the interpolated LUT being generated based, at least, on the third value, the first LUT and the second LUT, wherein:
   the LUT processing circuit is further configured to write the interpolated LUT to the configuration register of the ISP;
   the interpolation command is included in a compute kernel that is executed by the LUT processing circuit;
   the LUT processing circuit includes an operation control circuit and at least one LUT arithmetic and logic unit (ALU);
   the operation control circuit is configured to decode the compute kernel and schedule LUT processing operations included in the compute kernel for execution by the at least one LUT ALU; and
   the at least one LUT ALU is configured to execute the scheduled LUT processing operations, including the interpolation operation.

2. The camera of claim 1, wherein the LUT processing circuit is further configured to, during performance of the interpolation operation, write an intermediate interpolated LUT to the dynamic memory, the interpolated LUT being further generated based on the intermediate interpolated LUT and a third LUT of the plurality of predetermined LUTs.

3. The camera of claim 2, wherein the interpolation command is a chained interpolation command.

4. The camera of claim 2, wherein the LUT processing circuit incudes:
 a read direct memory access controller configured to read the first LUT and the second LUT from the dynamic memory; and
 a write direct memory access controller configured to write the intermediate interpolated LUT to the dynamic memory.

5. The camera of claim 4, further comprising a programming direct memory access (DMA) controller configured to:
 receive, from the software driver, a command to write the interpolated LUT to the configuration register; and
 in response to the command to write the interpolated LUT to the configuration register and an interrupt signal from the LUT processing circuit, write the interpolated LUT to the configuration register, the interrupt signal indicating completion of generation of the interpolated LUT.

6. The camera of claim 1, wherein the at least one LUT ALU includes a plurality of operationally parallel LUT ALUs, the operation control circuit being further configured to schedule parallel execution of LUT processing operations by the plurality of operationally parallel LUT ALUs.

7. The camera of claim 1, wherein the LUT processing circuit further includes a programming direct memory access (DMA) controller configured to:
 read the interpolation command from a command buffer included in the dynamic memory; and
 write the interpolated LUT to the configuration register.

8. A mobile electronic device including a camera, the mobile electronic device comprising:
 a dynamic memory;
 an image signal processor, ISP, including a configuration register;
 a software driver configured to:
  store, in the dynamic memory, a plurality of predetermined lookup tables, LUTs, a first LUT of the predetermined LUTs including first ISP configuration information corresponding with a first value of a quantitative image factor, and a second LUT of the predetermined LUTs including second ISP configuration information corresponding with a second value of the quantitative image factor, the second value being greater than the first value; and issue an interpolation command indicating a third value of the quantitative image factor corresponding with an image frame received by the ISP, the third value being greater than the first value and less than the second value; and a LUT processing circuit configured to receive the interpolation command, and in response to receiving the interpolation command:

read the first LUT and the second LUT; and perform at least one interpolation operation to generate an interpolated LUT, the interpolated LUT being generated based, at least, on the third value, the first LUT and the second LUT, wherein:

the LUT processing circuit is further configured to write the interpolated LUT to the configuration register of the ISP:

the interpolation command is included in a compute kernel that is executed by the LUT processing circuit;

the LUT processing circuit includes an operation control circuit and at least one LUT arithmetic and logic unit (ALU);

the operation control circuit is configured to decode the compute kernel and schedule LUT processing operations included in the compute kernel for execution by the at least one LUT ALU; and the at least one LUT ALU is configured to execute the scheduled LUT processing operations, including the interpolation operation.

9. A method comprising:

storing, in memory of a computing device, a plurality of predetermined lookup tables (LUTs), a first LUT of the predetermined LUTs including first image signal processor (ISP) configuration information corresponding with a first value of a quantitative image factor, and a second LUT of the predetermined LUTs including second ISP configuration information corresponding with a second value of the quantitative image factor, the second value being greater than the first value;

receiving, at a LUT processing circuit, an interpolation command indicating a third value of the quantitative image factor corresponding with an image frame received by the ISP, the third value being greater than the first value and less than the second value; and in response to receiving the interpolation command:

reading, by the LUT processing circuit, the first LUT and the second LUT;

performing an interpolation operation using the third value, the first LUT and the second LUT to generate an interpolated LUT; and writing the interpolated LUT to at least one of the memory or a configuration register of the ISP, wherein the interpolation command is included in a compute kernel that is executed by the LUT processing circuit;

the LUT processing circuit includes an operation control circuit and at least one LUT arithmetic and logic unit (ALU);

the operation control circuit is configured to decode the compute kernel and schedule LUT processing operations included in the compute kernel for execution by the at least one LUT ALU; and the at least one LUT ALU is configured to execute the scheduled LUT processing operations, including the interpolation operation.

10. The method of claim 9, wherein the interpolation command further includes:

an address of the first LUT in the memory of the computing device;

an address of the second LUT in the memory of the computing device; and an address of the configuration register of the ISP.

11. The method of claim 9, wherein the quantitative image factor is a first quantitative image factor, the interpolation operation is a first interpolation operation, the interpolated LUT is a first interpolated LUT, and the writing the interpolated LUT includes writing the first interpolated LUT to the memory, the method further comprising, in response to the interpolation command:

reading, by the LUT processing circuit, a third LUT of the plurality of predetermined LUTs;

performing an interpolation operation using a value of a second quantitative image factor, the first interpolated LUT and the third LUT to generate a second interpolated LUT; and writing the second interpolated LUT to at least one of the memory or the configuration register of the ISP.

12. The method of claim 11, wherein the interpolation command is a chained interpolation command.

13. The method of claim 9, further comprising, prior to writing the interpolated LUT to the configuration register of the ISP, performing by the LUT processing circuit on the interpolated LUT, at least one of a shift operation or a bitwise operation to format the interpolated LUT for writing to the configuration register of the ISP.

14. The method of claim 9, wherein the interpolation operation is a bilinear interpolation operation.

* * * * *